United States Patent
Cantero Clares

(10) Patent No.: US 12,519,920 B1
(45) Date of Patent: Jan. 6, 2026

(54) STEREOSCOPIC IMAGE DISPLAY SYSTEM AND STEREOSCOPIC IMAGE DISPLAY METHOD THEREOF

(71) Applicant: Acer Incorporated, New Taipei (TW)

(72) Inventor: Sergio Cantero Clares, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/890,697

(22) Filed: Sep. 19, 2024

(51) Int. Cl.
| | |
|---|---|
| *H04N 13/293* | (2018.01) |
| *G09G 3/00* | (2006.01) |
| *H04N 13/172* | (2018.01) |
| *H04N 13/398* | (2018.01) |
| *H04N 13/31* | (2018.01) |

(52) U.S. Cl.
CPC ........... *H04N 13/293* (2018.05); *G09G 3/003* (2013.01); *H04N 13/172* (2018.05); *H04N 13/398* (2018.05); *G09G 2354/00* (2013.01); *H04N 13/31* (2018.05)

(58) Field of Classification Search
None
See application file for complete search history.

(56) References Cited

U.S. PATENT DOCUMENTS

2012/0056879 A1* 3/2012 Song ............. H04N 13/31
345/419
2025/0067994 A1* 2/2025 Gao ............. H04N 13/305

FOREIGN PATENT DOCUMENTS

| CN | 108076337 | 5/2018 |
| CN | 115941920 | 4/2023 |

* cited by examiner

*Primary Examiner* — Eileen M Adams
(74) *Attorney, Agent, or Firm* — JCIPRNET

(57) ABSTRACT

A stereoscopic image display system and a stereoscopic image display method thereof are disclosed. The method is adapted to the stereoscopic image display system including a first stereoscopic display and includes the following steps. The method is applicable to the stereoscopic image display system including a first stereoscopic display and comprises the following steps. An image frame is obtained. Multiple image regions are identified from the display image frame, wherein the image regions include a two-dimensional content image region and a three-dimensional content image region. A rendering priority of each image region is determined based on a regional characteristic of each image region. According to the rendering priority of each image region, image content of each image region is sequentially drawn into a first stereoscopic format image including a first left-eye image and a first right-eye image. The first stereoscopic format image is displayed by the first stereoscopic display operating in stereoscopic display mode.

18 Claims, 12 Drawing Sheets

STEREOSCOPIC IMAGE DISPLAY SYSTEM AND STEREOSCOPIC IMAGE DISPLAY METHOD THEREOF

BACKGROUND

Technical Field

The disclosure relates to an image processing technology, and in particular, to a stereoscopic image display system and a stereoscopic image display method thereof.

Description of Related Art

With the advancement of display technology, stereoscopic displays that support stereoscopic vision technology have gradually become popular. Stereoscopic vision technology allows viewers to feel the three-dimensionality of images, such as the three-dimensional facial features and depth of field of characters, etc. However, traditional 2D images cannot present this effect. The principle of stereoscopic vision technology is to let the viewer's left eye view the left-eye image and the viewer's right eye to view the right-eye image, so that the viewer can experience the 3D visual effect. The stereoscopic display can provide the left-eye image and the right-eye image to the left and right eyes of the viewer respectively, so as to provide people with a visually immersive experience. It can be seen that for the image content of a specific 3D image format, the stereoscopic display needs to use the corresponding stereoscopic display technology to achieve a display result that allows the viewer to experience the 3D visual effect. However, the current stereoscopic display range is full screen, which obviously limits the application range of stereoscopic display.

SUMMARY

The disclosure provides a stereoscopic image display system and a stereoscopic image display method thereof that can effectively solve the above problems.

An exemplary embodiment of the disclosure provides a stereoscopic image display method, which is adapted to a stereoscopic image display system including a first stereoscopic display and includes the following steps. A display frame is obtained. A plurality of image regions are identified from the display frame, wherein the image regions include a two-dimensional content image regions and a three-dimensional content image region. A rendering priority of each of the image regions is determined based on a regional characteristic of each of the image regions. According to the rendering priority of each of the image regions, image content of the image regions is sequentially drawn into a first stereoscopic format image including a first left-eye image and a first right-eye image. The first stereoscopic format image is displayed by the first stereoscopic display operating in a stereoscopic display mode.

Another exemplary embodiment of the disclosure provides a stereoscopic image display system, which includes a first stereoscopic display and at least one processor. The processor is coupled to the first stereoscopic display and configured to perform the following operations. A display frame is obtained. A plurality of image regions are identified from the display frame, wherein the image regions include a two-dimensional content image regions and a three-dimensional content image region. A rendering priority of each of the image regions is determined based on a regional characteristic of each of the image regions. According to the rendering priority of each of the image regions, image content of the image regions is sequentially drawn into a first stereoscopic format image including a first left-eye image and a first right-eye image. The first stereoscopic format image is displayed by the first stereoscopic display operating in a stereoscopic display mode.

Based on the above, in the embodiment of the disclosure, after acquiring the display frame, multiple image regions in the display frame may be identified. The image regions include the two-dimensional content image region and the three-dimensional content image region. The rendering priority of each image region may be determined based on the area characteristic of each image region. The image content of the image regions may be drawn sequentially in the left-eye image and the right-eye image of the first stereoscopic format image. Based on this, it can ensure that the three-dimensional image content and the two-dimensional image content of the display frame can be displayed correctly, and allow users to experience a new visual experience.

DESCRIPTION OF THE EMBODIMENTS

Figure 1:
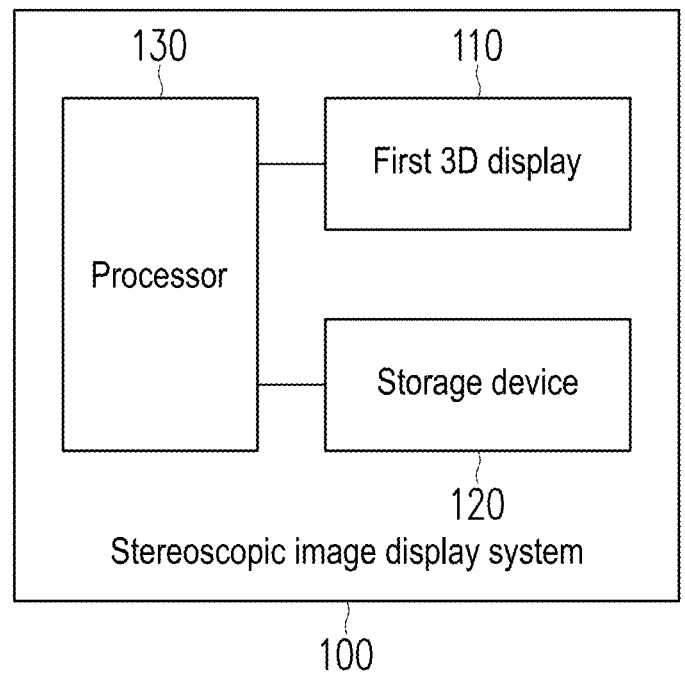
FIG. 1 is a schematic diagram of a stereoscopic image display system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a stereoscopic image display system according to an embodiment of the disclosure. Referring to FIG. 1, the stereoscopic image display system 100 may include a first stereoscopic display 110, a storage device 120, and at least one processor 130. In various embodiments, the stereoscopic image display system 100 may be implemented as an integrated system or a separate system. In some embodiments, the first stereoscopic display 110, the storage device 120, and the processor 130 may be implemented in an all-in-one (AIO) electronic device, such as a notebook computer, a tablet computer, a desktop computer, a game console, portable electronic devices or other personal electronic devices. Alternatively, in some embodiments, the first stereoscopic display 110 may be connected to a computer device including the storage device 120 and the processor 130 via a wired or wireless transmission interface.

The first stereoscopic display 110 may allow the user to experience a stereoscopic visual effect. In order to allow the user to experience the 3D visual effect through the first stereoscopic display 110, the first stereoscopic display 110 may allow the user's left eye and right eye to view different viewing angles according to its hardware specifications and the stereoscopic display technology applied thereto. The image content (i.e. the first left eye image and the first right eye image).

To enable users to experience a 3D visual effect through the first stereoscopic display 110, the first stereoscopic display 110 may allow the user's left eye and right eye to respectively view the image content corresponding to different perspectives (i.e., the first left-eye image and the first right-eye image) according to its hardware specifications and the applied 3D display technology.

In some embodiments, the first stereoscopic display 110 may be a naked-eye stereoscopic display, which may be implemented as a notebook computer monitor, a television, a desktop screen, an electronic signage, or the like. In some embodiments, the left eye image and the right eye image may be displayed simultaneously based on stereoscopic image display technology, such as parallax barrier technology, lens technology, or directional backlight technology. Alternatively, in some embodiments, the first stereoscopic display 110 may be a head-mounted display device, such as a virtual reality display device or a mixed reality display device, or the like.

From another aspect, the first stereoscopic display 110 may include a liquid crystal display (LCD), a light-emitting diode (Light-Emitting Diode, LED) display, an organic light-emitting diode display (Organic Light-Emitting Diode), OLED) or other types of displays, the disclosure is not limited thereto.

The storage device 120 is configured to temporarily or permanently store data, such as images, instructions, program codes, software modules, etc. Specifically, the storage device 120 may include volatile storage circuitry. Volatile storage circuits are used to store data in a volatile manner. For example, the volatile storage circuit may include random access memory (RAM) or similar volatile storage media. Alternatively, storage device 120 may include non-volatile storage circuitry. Non-volatile storage circuits are used to store data in a non-volatile manner. For example, the non-volatile storage circuit may include read only memory (ROM), solid state drive (SSD) and/or traditional hard disk drive (HDD) or similar Non-volatile storage media. The number of storage devices 120 may be one or more, and this disclosure does not limit this.

The processor 130 may be connected to the first stereoscopic display 110 and the storage device 120. For example, the processor 130 may include a central processing unit (CPU), a graphics processing unit (GPU), or other programmable general or special-purpose microprocessor, digital signal processor (DSP), programmable controller, application specific integrated circuit (ASIC), programmable logic device (PLD) or other similar devices or a combination of these devices. The number of processors 130 may be one or more, and this disclosure does not limit this.

Figure 2:
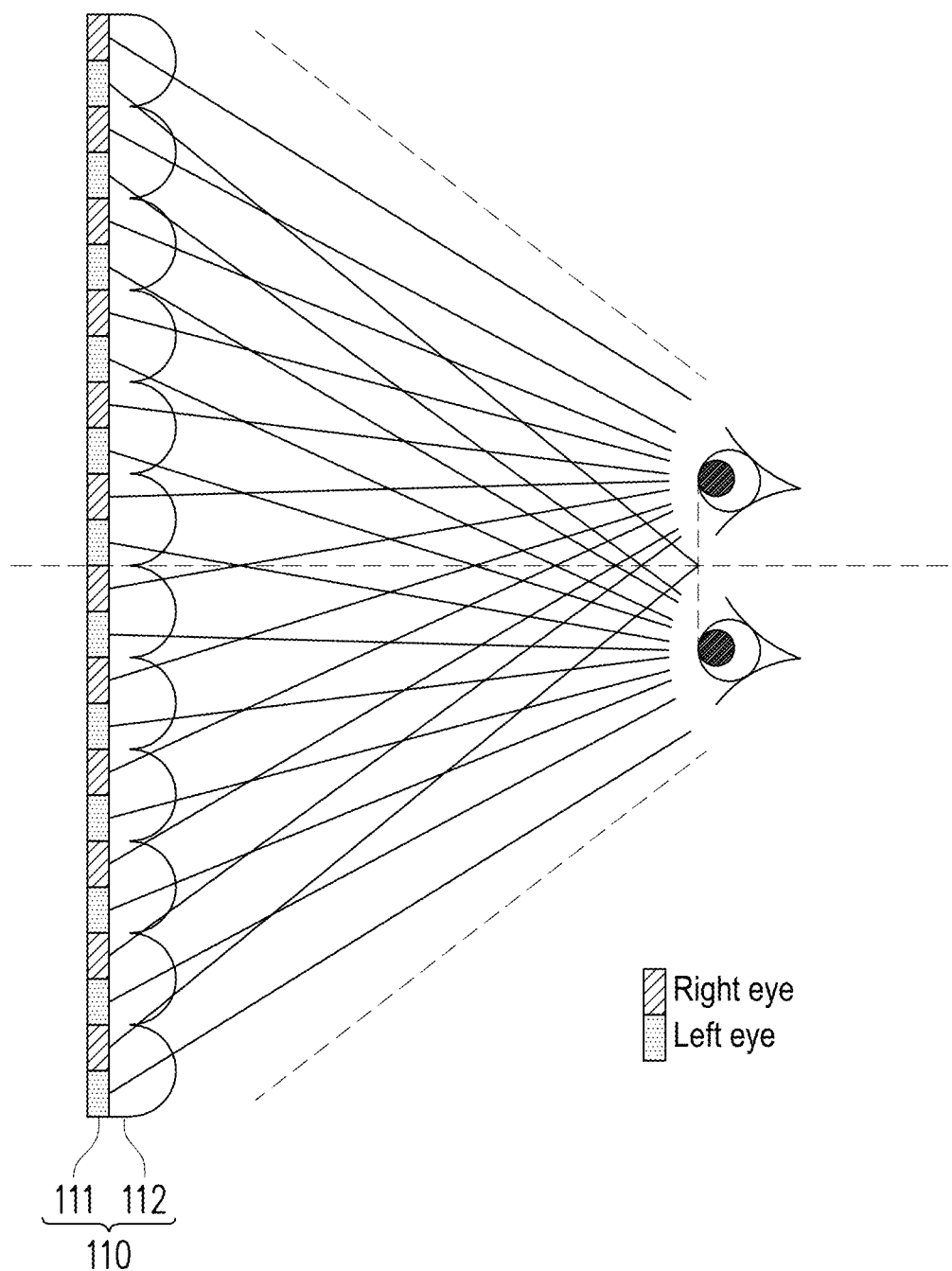
FIG. 2 is a schematic diagram of a stereoscopic display according to an embodiment of the disclosure.

FIG. 2 is a schematic diagram of a stereoscopic display according to an embodiment of the disclosure. Referring to FIG. 2, in some embodiments, the first stereoscopic display 110 may be a naked-eye stereoscopic display, which may provide different images for the left eye and the right eye through the lens refraction principle, so that the viewer may experience Stereoscopic display effect. The first stereoscopic display 110 may include a display panel 111 and a lens layer 112. The lens layer 112 is disposed above the display panel 111, and viewers may see the image content provided by the display panel 111 through the lens layer 112. The first stereoscopic display 110 may place the pixels of the first left-eye image and the pixels of the first right-eye image at corresponding pixel positions of the display panel 111 respectively. The lens layer 112 refracts different display contents (i.e., the left eye image and the right eye image) to different positions in space through the refraction of light, so that the left eye and the right eye may respectively receive two different images with parallax. It may be seen that, to place the pixels of the left-eye image and the right-eye image in the corresponding pixel positions on the display panel 111, the left-eye image and the right-eye image need to undergo image weaving processing to generate an interleaved frame with the pixels of the left-eye image and the pixels of the right-eye image arranged in an alternating pattern.

Figure 3:
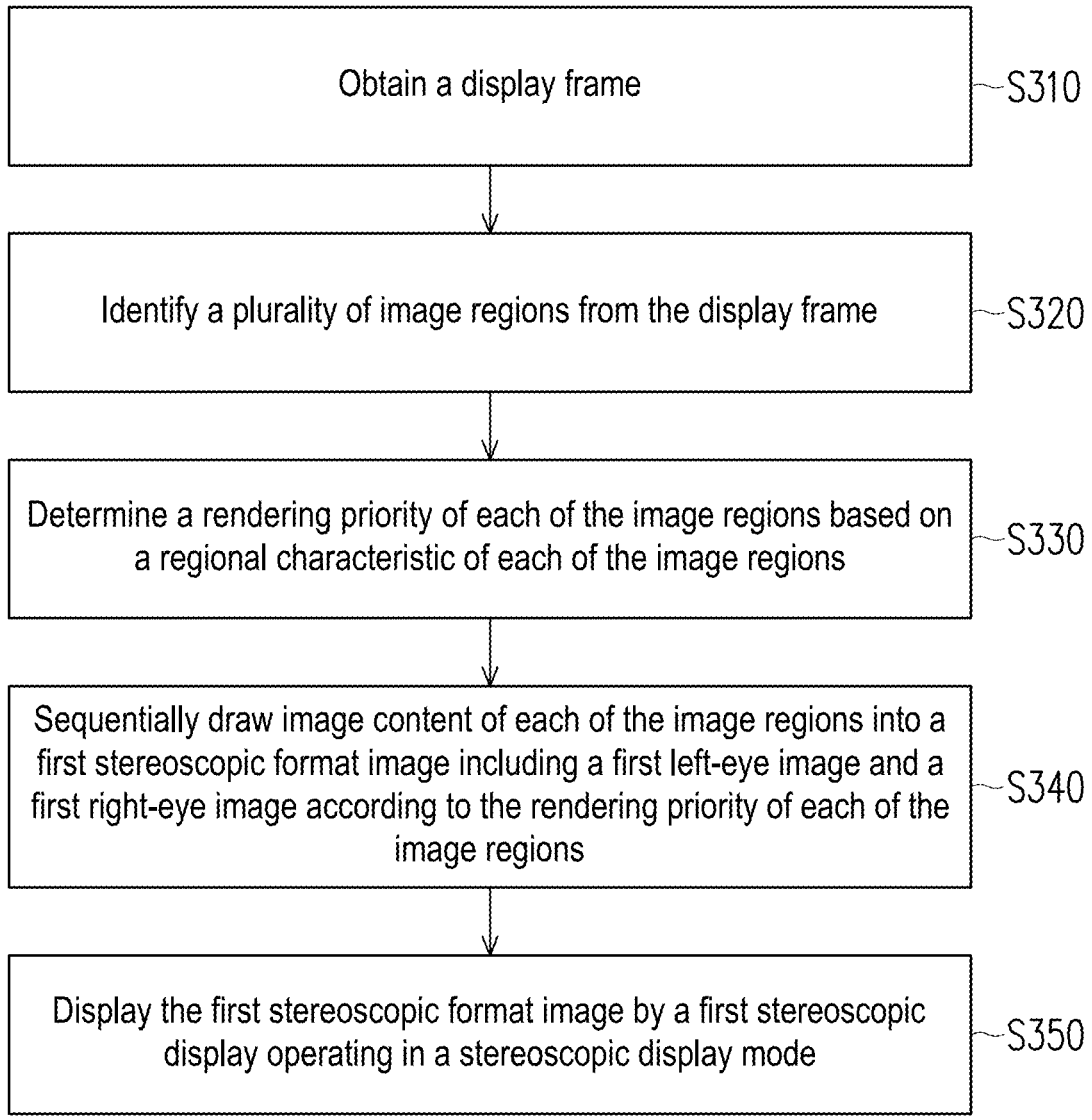
FIG. 3 is a flowchart of a stereoscopic image display method according to an embodiment of the disclosure.

FIG. 3 is a flowchart of a stereoscopic image display method according to an embodiment of the disclosure. Referring to FIG. 3, the operation process of this embodiment is applicable to the stereoscopic image display system 100 in the above embodiment. The detailed steps of this embodiment will be described below with various components in the stereoscopic image display system 100.

In step S310, the processor 130 may obtain a display frame. In some embodiments, the processor 130 may utilize a screenshot function to obtain a display frame including multiple operating windows. In some embodiments, the processor 130 may utilize a screenshot function to obtain display frames including a streaming image. The streaming image may be two-dimensional images or images in a three-dimensional format (e.g. side-by-side images). In some embodiments, the streaming image may come from a video stream of a video conferencing program, a multimedia player program or a browser program. In some embodiments, when the processor 130 executes a video conferencing software, the processor 130 may receive the streaming image provided by the conference participant through the transceiver, and generate a display frame including the window operation interface of the video conferencing software and a streaming image.

In some embodiments, the processor 130 may retrieve the display frame through an application programming interface (API) provided by the operating system. For example, the processor 130 may use a screen capture technology such as "Desktop Duplication API" or "DirectX Graphics Infrastructure (DXGI)" of the Windows operating system to obtain the display frame, but it is not limited thereto.

In step S320, the processor 130 may identify a plurality of image regions from the display frame. These image regions include the window region, the desktop region, the component region of the graphical user interface component within the window, the display region of the streaming image within the window, or various operating interface regions within the window. The image regions include a two-dimensional content image region and a three-dimensional content image region. The image content of the 2D content image region is in 2D format. That is, the 2D content image region includes image content from a single perspective. The image content of the 3D content image region is in a three-dimensional format, such as a side-by-side format. That is, the 3D content image region includes image content from different perspectives.

In some embodiments, the processor 130 may obtain window information of an application. The processor 130 may identify at least one of the image regions according to the window information. Furthermore, the processor 130 may identify one or more image regions according to the operating interface information and window information provided by the application program. In some embodiments, by identifying the window range of the operation window, the processor 130 may identify one or more image regions from the display frame. By identifying the graphical user interface (GUI) components in the operation window, the processor 130 may identify one or more image regions from the display frame. By identifying the display range of the stream image of the operation window, the processor 130 may identify one or more image regions from the display frame.

In some embodiments, the processor 130 may recognize the 3D content blocks in the display frame to identify the 3D content image regions among the image regions. Furthermore, the processor 130 may detect 3D content in the display frame to identify one or more image regions. For example, the processor 130 may identify the side-by-side image presented in a certain window and obtain a corresponding three-dimensional content image region. For example, the processor 130 may recognize the side-by-side images by detecting patterns embedded in the streaming images. Alternatively, the processor 130 may utilize a deep learning model to recognize the side-by-side images in the display frame.

Figure 4:
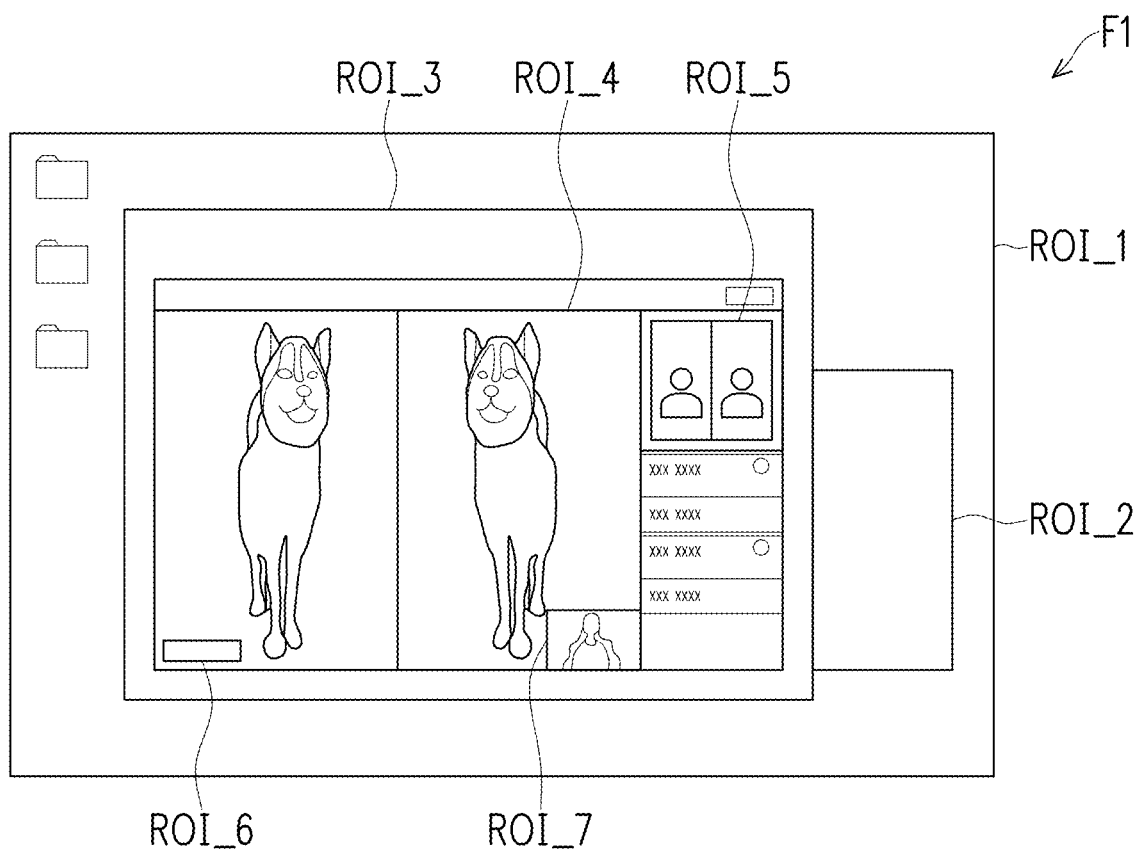
FIG. 4 is a schematic diagram of multiple image regions according to an embodiment of the disclosure.

For example, FIG. 4 is a schematic diagram of multiple image regions according to an embodiment of the disclosure. Referring to FIG. 4, the processor 130 may identify multiple image regions ROI_1 to ROI_7 from the display frame F1. The image region ROI_1 is the desktop region. The image region ROI_2 is the window region. The image region ROI_3 is another window region. The image region ROI_4 is the display region of the first streaming image of the application. The image region ROI_5 is the display region of the second streaming image of the application. The image region ROI_6 is the component region of the GUI component of the application. The image region ROI_7 is the display region of the third streaming image of the application. For example, the application may be a video conferencing application. The first streamed image may be a image shared by a conference participant. The second stream image and the third stream image may be video images of conference participants. In this example, the image regions ROI_1, ROI_2, ROI_3, ROI_6, and ROI_7 may be 2D content image regions. The image regions ROI_4 and ROI_5 may be 3D content image regions. That is, the first stream image in the image region ROI_4 may be a side-by-side image, and the second stream image in the image region ROI_5 may also be a side-by-side image.

In step S330, the processor 130 may determine the rendering priority of each of the image regions according to the regional characteristic of each image region. That is, the processor 130 may assign a corresponding priority index to each image region. The rendering priority is configured to indicate the order in which the image content of each image region is drawn in the stereoscopic format image. When the rendering priority of the first image region is higher than the rendering priority of the second image region, the processor 130 may first draw the image content of the first image region, and then draw the image content of the second image region. In this case, the image content of the second image region may partially overlay the image content of the first image region.

In some embodiments, the processor 130 may determine the rendering priority of each of the image regions according to a window depth of a window corresponding to each of the image regions. In detail, the processor 130 may identify one or more windows currently displayed in the display frame. The windows may be associated with one or more applications. The operating system's Window Manager is responsible for managing the stacking order and depth information of all windows. The processor 130 may obtain the window depth of each window according to the depth attribute (commonly referred to as Z-order or Z-index) assigned to each window by the window manager. In some embodiments, darker image regions are given higher rendering priority. The processor 130 may sort the window depths of each window in descending order and determine the rendering priority of each image region based on the ranking of the window depths.

For example, the depth attribute of the image region corresponding to the desktop region may be 0 (i.e., Z-order=0). The depth attribute of the image region corresponding to the first window region may be 1 (i.e., Z-order=1). The depth attribute of the image region corresponding to the second window region may be 2 (i.e., Z-order=2). In this case, the rendering priority of the image region corresponding to the desktop region is higher than the rendering priority of the image region corresponding to the first window region. The rendering priority of the image region corresponding to the first window region is higher than the rendering priority of the image region corresponding to the second window region.

In some embodiments, the processor 130 may determine the rendering priority of each of the image regions according to a position of region boundary of each of the image region. In some embodiments, the processor 130 may determine the rendering priority of each image region according to the distance between the region boundary of each image region and the display boundary. In some embodiments, the image region closer to the display boundary is given higher rendering priority. The processor 130 may determine the rendering priority of each image region through table lookup or function calculation.

In some embodiments, the processor 130 may determine the rendering priority of each image region according to a region size of each of the image regions. The region size may include width, height or area, etc. The image region with larger region size is given higher rendering priority. The processor 130 may determine the rendering priority of each image region through table lookup or function calculation.

In some embodiments, the processor 130 may determine the rendering priority of each image region according to the region size of each image region, the position of region boundary, the window depth of the corresponding window, or a combination thereof.

Figure 5:
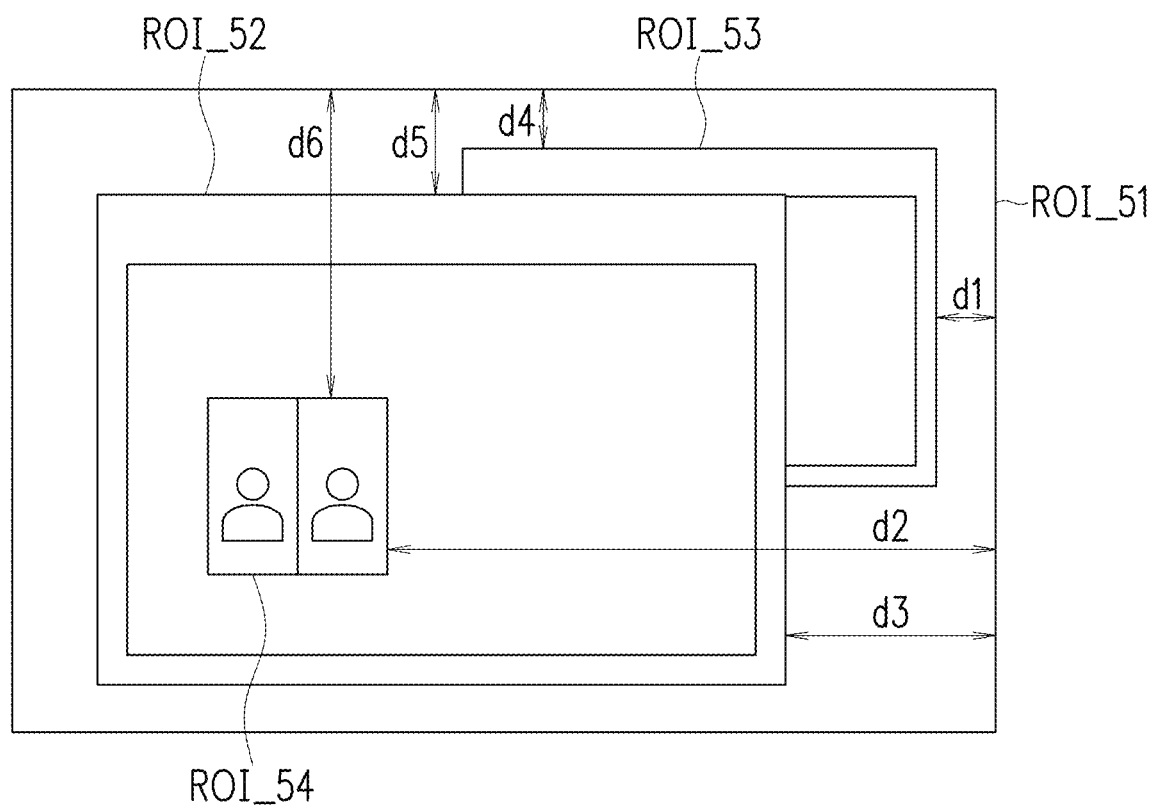
FIG. 5 is a schematic diagram of determining rendering priorities according to an embodiment of the disclosure.

For example, FIG. 5 is a schematic diagram of determining rendering priority according to an embodiment of the disclosure. Referring to FIG. 5, the processor 130 may identify multiple image regions ROI_51 to ROI_54, and determine the rendering priority based on the position of region boundary of each image region ROI_51 to ROI_54.

The image region ROI_51 is a desktop region, so the processor 130 may determine the rendering priority of the image region ROI_51 to be the first priority. The processor 130 may calculate the distance between the image regions ROI_52 to ROI_54 and the display boundary. For example, the processor 130 may obtain the distances d3 and d5 between the image region ROI_52 and the display boundary. The processor 130 may obtain the distances d1 and d4 between the image region ROI_53 and the display boundary. The processor 130 may obtain the distances d2 and d6 between the image region ROI_54 and the display boundary. After comparing the distances d1, d2, and d3 and comparing the distances d4, d5, and d6, the processor 130 may determine that the rendering priority of the image region ROI_53 is the second priority, the rendering priority of the image region ROI_52 is the third priority, and the rendering priority of the image region ROI_54 is the fourth priority.

Figure 6:
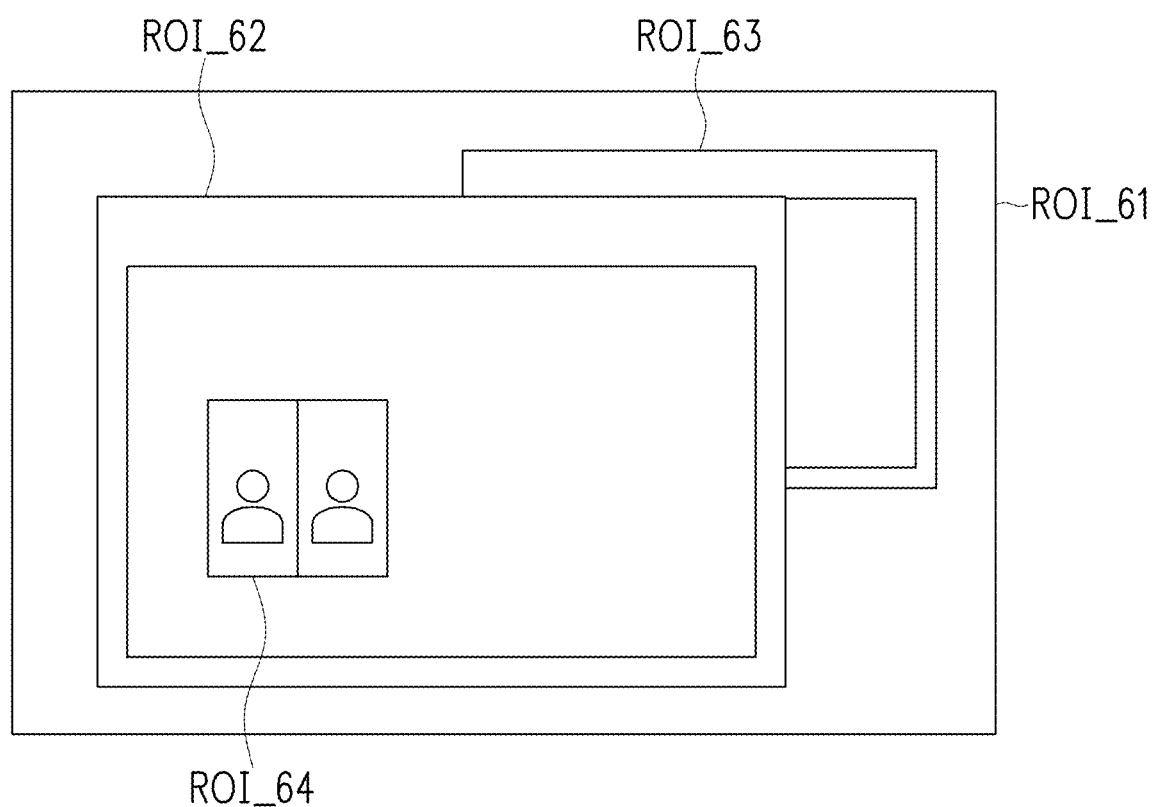
FIG. 6 is a schematic diagram of determining rendering priorities according to an embodiment of the disclosure.

For example, FIG. 6 is a schematic diagram of determining rendering priority according to an embodiment of the disclosure. Referring to FIG. 6, the processor 130 may identify multiple image regions ROI_61 to ROI_64 and determine the rendering priority according to the window depth of the window corresponding to each image region ROI_61 to ROI_64. The image region ROI_61 is a desktop region and has the smallest Z-order, so the processor 130 may determine the rendering priority of the image region ROI_61 to be the first priority. The processor 130 may calculate the window depth of the window corresponding to the image regions ROI_62 to ROI_64. For example, the processor 130 may obtain that the Z-order of the image region ROI_62 is 2. The processor 130 may obtain that the Z-order of the image region ROI_63 is 1. The processor 130 may obtain that the Z-order of the image region ROI_64 is 2. Therefore, the processor 130 may determine the rendering priority of the image region ROI_63 to be the second priority.

It should be noted that, the image region ROI_64 and the image region ROI_62 correspond to the same window, and therefore have the same window depth. Thereafter, the processor 130 may compare the region size of the image region ROI_64 with the region size of the image region ROI_62. Since the region size of the image region ROI_64 is smaller than the region size of the image region ROI_62, the processor 130 may determine the rendering priority of the image region ROI_62 to be the third priority and the rendering priority of the image region ROI_64 to be the fourth priority.

Returning to FIG. 3, in step S340, the processor 130 may sequentially draw the image content of each of the image regions in the first stereoscopic format including the first left-eye image and the first right-eye image according to the rendering priority of each of the image regions. According to the rendering priority of each image region, the processor 130 may sequentially draw the image content of each image region into the first left-eye image and the first right-eye image of the first stereoscopic format image.

In some embodiments, in response to that the rendering priority of the first image region is higher than the rendering priority of the second image region, the processor 130 may first draw the image content of the first image region to the first stereoscopic format image and then draw the image content of the second image region. The image content of the second image region in the first stereoscopic format image partially overlaps the image content of the first image region in the first stereoscopic format image. Furthermore, the higher the rendering priority of a image region, the earlier the order in which the image region is drawn in the first stereoscopic format image.

In some embodiments, when processing the image region belonging to the 3D content image region in the display frame, the processor 130 may obtain the sub-left eye image and the sub-right eye image of the 3D content image region. Afterwards, the processor 130 may draw the sub-left-eye image in the first left-eye image of the first stereoscopic format image, and draw the sub-right-eye image in the first right-eye image of the first stereoscopic format image. When processing the image region belonging to the two-dimensional content image region, the processor 130 may draw the 2D content image region in the first right eye image and the first left eye image of the first stereoscopic format image.

For example, the first left-eye image of the first stereoscopic format image may include the image content of the 2D content image region and the sub-left-eye image of the 3D content image region in the display frame. The first right-eye image of the stereoscopic format image may include image content of the 2D content image region and a sub-right-eye image of the 3D content image region in the display frame. In other words, the first stereoscopic format image may simultaneously include 3D image content with parallax and two-dimensional image content without parallax.

Figure 7:
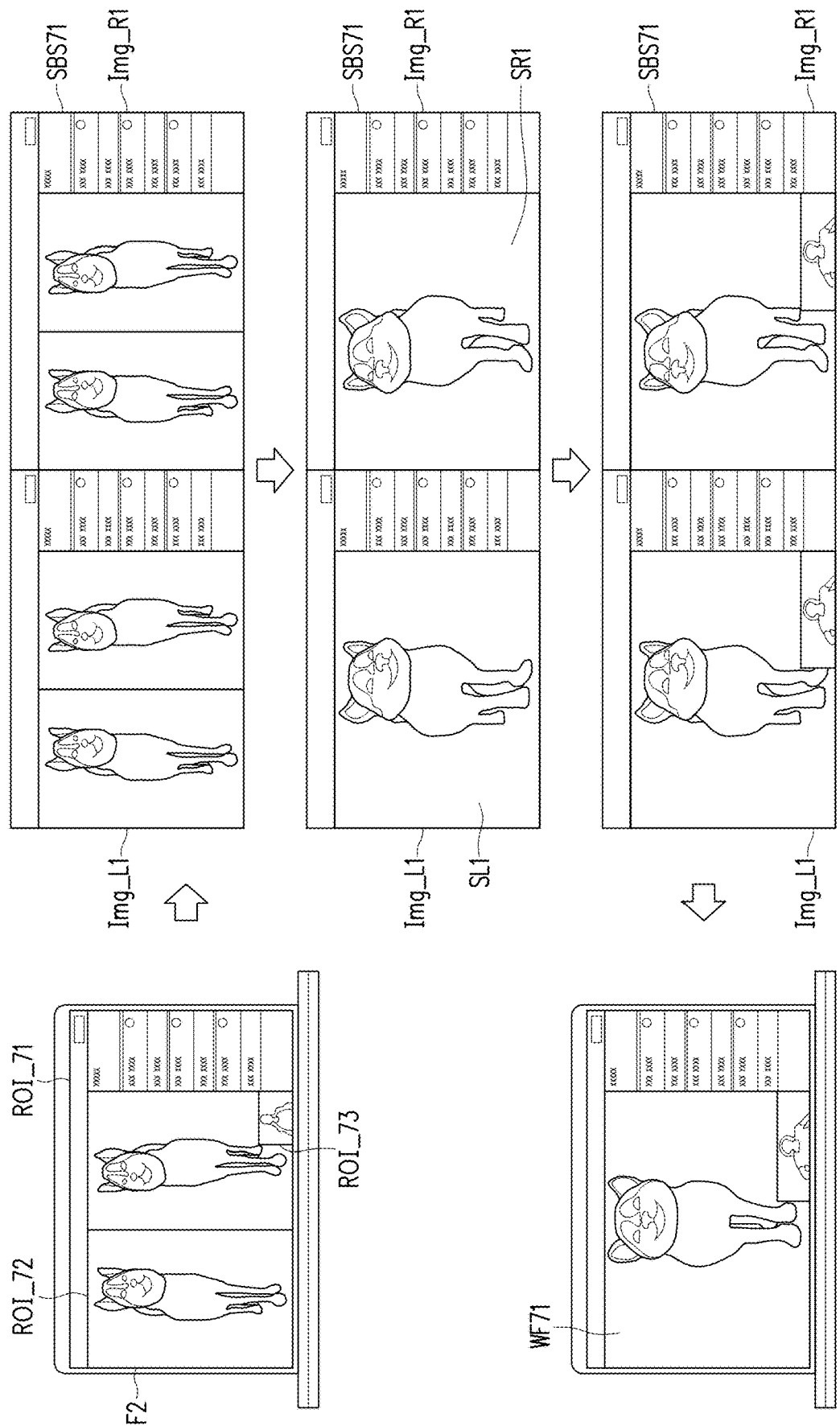
FIG. 7 is a schematic diagram of generating and displaying a first stereoscopic format image according to an embodiment of the disclosure.

For example, FIG. 7 is a schematic diagram of generating and displaying a first stereoscopic format image according to an embodiment of the disclosure. Referring to FIG. 7, the processor 130 may capture the display frame F2. Afterwards, the processor 130 may identify multiple image regions ROI_71 to ROI_73 in the display frame F2, and determine the respective rendering priorities of the image regions ROI_71 to ROI_73. The image regions ROI_71 and ROI_73 are 2D content image regions, and the image region ROI_72 is a 3D content image region. In this example, the rendering priority of image region ROI_71 is higher than the rendering priority of image region ROI_72 and the rendering priority of image region ROI_73. The rendering priority of the image region ROI_72 is higher than the rendering priority of the image region ROI_73.

Therefore, the processor 130 first draws the image content of the image region ROI_71 on the first left-eye image Img_L1 and the first right-eye image Img_R1 in the first stereoscopic format image SBS71. Next, the processor 130 may draw the sub-left-eye image SL1 of the image region ROI_72 in the first left-eye image Img_L1 in the first stereoscopic format image SBS71, and draw the sub-right-eye image SR1 of the image region ROI_72 in the first right-eye image Img_R1 in the first stereoscopic format SBS71. It should be noted that the processor 130 may perform image scaling processing on the sub-right eye image SR1 and the sub-left eye image SL1 of the image region ROI_72. Next, the processor 130 may draw the image content of the image region ROI_73 on the first left-eye image Img_L1 and the first right-eye image Img_R1 in the first stereoscopic format image SBS71. Finally, the processor 130 may perform image weaving processing on the first stereoscopic format image SBS71, and drive the first stereoscopic display 110 to display the weaved image frame WF71.

Based on this, the processor 130 may generate the first stereoscopic format image SBS71 based on the image content of the display frame F2. By identifying multiple image regions ROI_71 to ROI_73 and assigning corresponding rendering priorities, it is possible to prevent the two-dimensional content image region (such as the image region ROI_73) located in the three-dimensional content image region from being missed or being unclearly displayed. That is, it may be avoided that the image content of the image region ROI_73 is only visible to the viewer's left eye or right eye.

Returning to FIG. 3, in step S350, the first stereoscopic display 110 operating in the stereoscopic display mode may display the first stereoscopic format image. In some embodiments, in response to receiving a user instruction or deciding that the display frame includes a three-dimensional content image region, the processor 130 may control the first stereoscopic display 110 to operate in a stereoscopic display mode to display the first stereoscopic format image. Specifically, when the first stereoscopic display 110 is a naked-eye stereoscopic display, the processor 130 may perform image weaving processing on the first stereoscopic format image (such as an SBS image) to obtain a woven image. This image weaving process arranges the pixels of the left-eye image and the right-eye image of the first stereoscopic format image in an interleaved manner within the woven image. Afterwards, when the first stereoscopic display 110 operates in the stereoscopic display mode, the display panel 111 of the first stereoscopic display 110 may display the woven image, and the refraction function of the lens layer 112 of the first stereoscopic display 110 is enabled, so that the viewer may feel the three-dimensional visual effect.

For example, in the operating context of the processor 130 executing the video conferencing software, the first stereoscopic display 110 may display the stereoscopic streaming content provided by the conference participant and the two-dimensional window operation interface, and the user may experience a stereoscopic visual effect from the stereoscopic streaming content provided by the conference participant.

Figure 8:
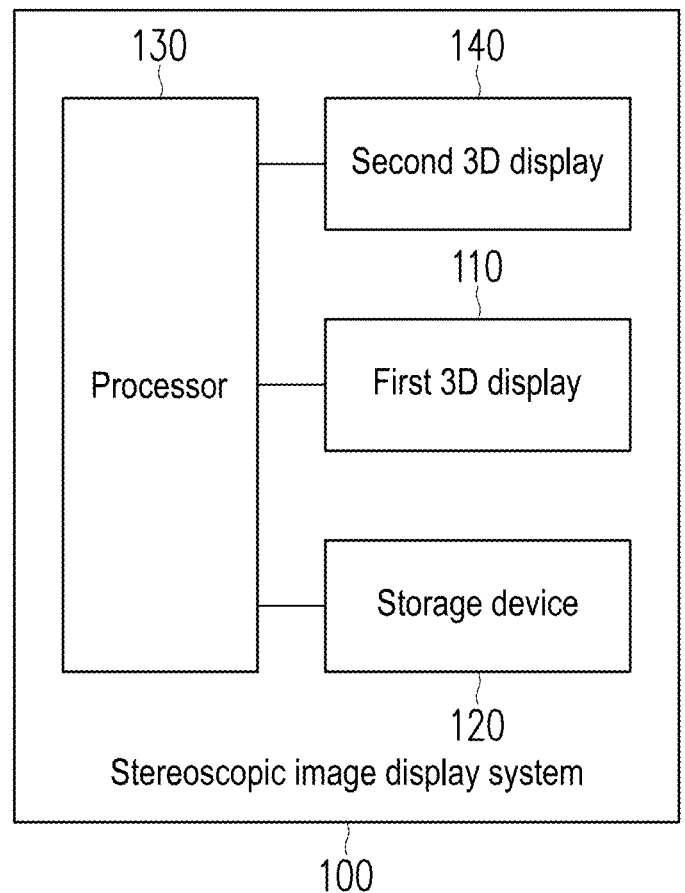
FIG. 8 is a schematic diagram of a stereoscopic image display system according to an embodiment of the disclosure.

FIG. 8 is a schematic diagram of a stereoscopic image display system according to an embodiment of the disclosure. Referring to FIG. 8, the stereoscopic image display system 200 may include a first stereoscopic display 110, a storage device 120, at least one processor 130 and a second stereoscopic display 140. The description of the first stereoscopic display 110, the storage device 120 and the processor 130 may be referred to FIG. 1 and will not be described again here. In this embodiment, the stereoscopic image display system 200 may further include a second stereoscopic display 140. The second stereoscopic display 140 may be a display with similar hardware specifications to the first stereoscopic display 110, and may also be a display device that allows the user to experience a stereoscopic visual effect. The second stereoscopic display 140 and the first stereoscopic display 110 may be arranged side by side to implement a splicing display function.

Figure 9:
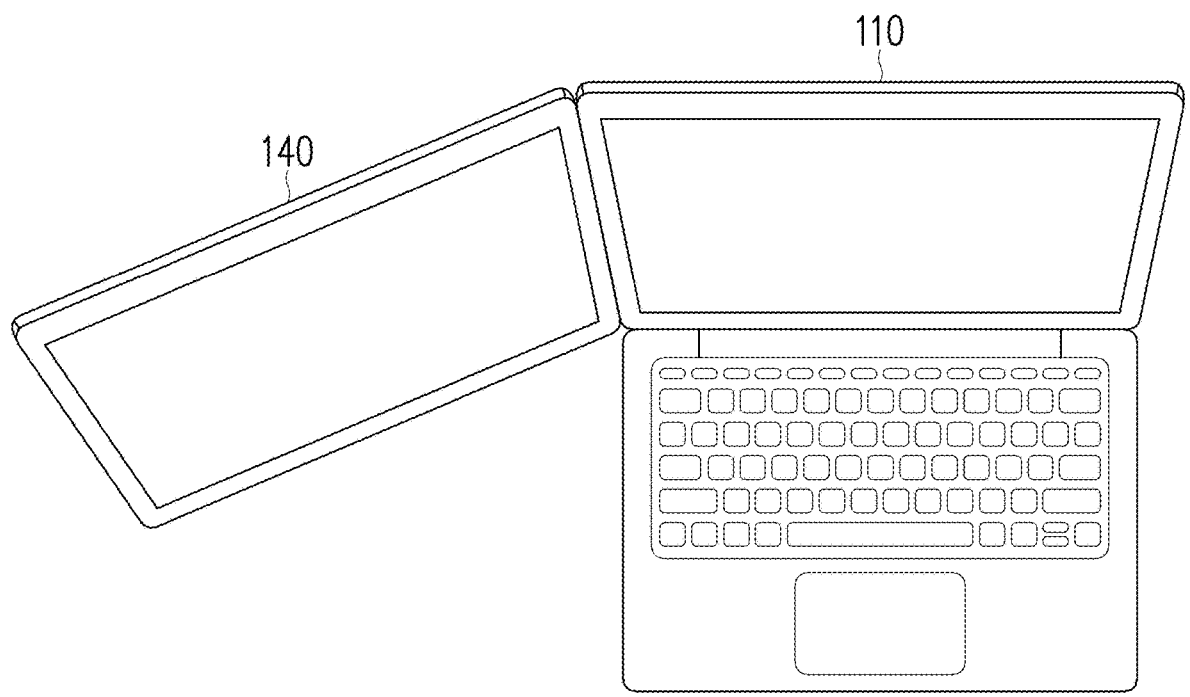
FIG. 9 is a schematic diagram of multiple stereoscopic displays according to an embodiment of the disclosure.

For example, FIG. 9 is a schematic diagram of a multi-stereoscopic display according to an embodiment of the disclosure. Referring to FIG. 9, the second stereoscopic display 140 may be arranged side by side with the first stereoscopic display 110. It may be seen that the spliced display of the second stereoscopic display 140 and the first stereoscopic display 110 may increase the display range. The second stereoscopic display 140 and the first stereoscopic display 110 may both be naked-eye stereoscopic displays, for example. The first stereoscopic display 110 may be used to display a first stereoscopic format image, and the second stereoscopic display 140 may be used to display a second stereoscopic format image. The first stereoscopic format image and the second stereoscopic format image may both be side-by-side images.

Figure 10:
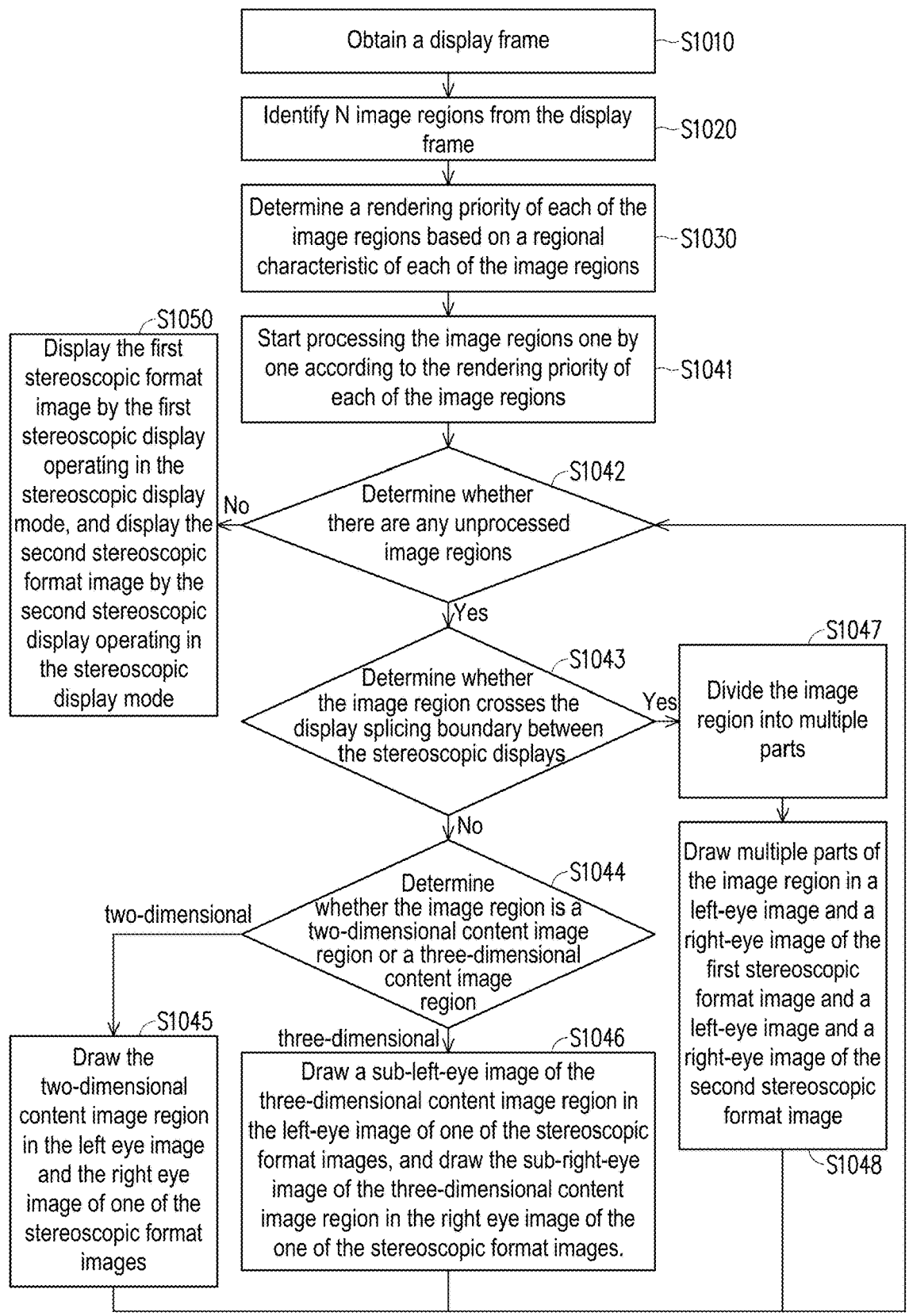
FIG. 10 is a flowchart of a stereoscopic image display method according to an embodiment of the disclosure.

FIG. 10 is a flowchart of a stereoscopic image display method according to an embodiment of the disclosure. Referring to FIG. 10, the operation flow of this embodiment is applicable to the stereoscopic image display system 200 in the above embodiment. The detailed steps of this embodiment will be described below with various components in the stereoscopic image display system 200.

In step S1010, the processor 130 may obtain a display frame. In step S1020, the processor 130 may identify multiple image regions from the display frame. In step S1030, the processor 130 may determine the rendering priority of each of the image regions according to the regional characteristic of each of the image regions. The detailed implementation content of steps S1010 to S1030 may be referred to the description in FIG. 3 and will not be described again.

In this embodiment, in step S1040, the processor 130 may sequentially draw each of the image regions in the first stereoscopic format image including the first left-eye image and the first right-eye image and a second stereoscopic format image including a second left-eye image and a second right-eye image. The step S1040 may be implemented as steps S1041 to S1048.

In step S1041, the processor 130 may start processing multiple image regions one by one according to the rendering priority of each image region. That is, the processor 130 begins to draw the image content of each image regions into the first stereoscopic format image and/or the second stereoscopic format image one by one according to the rendering priority of each image region.

In step S1042, the processor 130 may determine whether there are any unprocessed image regions. That is to say, the processor 130 may determine whether there is an image region that has not been drawn into the first stereoscopic format image and/or the second stereoscopic format image.

If step S1042 is determined as yes, the processor 130 takes a certain image region that has not been drawn into the first stereoscopic format image and/or the second stereoscopic format image as the currently processed image region. Next, in step S1043, the processor 130 determines whether the currently processed image region crosses the display splicing boundary between the stereoscopic displays. That is, the processor 130 determines whether the currently processed image region has part of the image content appearing on the first stereoscopic display 110 and another part of the image content appearing on the second stereoscopic display 140.

If step S1042 is determined as no, in step S1044, the processor 130 may determine whether the currently processed image region is a two-dimensional content image region or a three-dimensional content image region. If the processor 130 determines that the currently processed image region is a two-dimensional content image region, step S1045 is continued. In step S1045, the processor 130 may draw the two-dimensional content image region in the left eye image and the right eye image of one of the stereoscopic format images. For example, if the currently processed image region is located in the display range of the first stereoscopic display 110, the processor 130 draws the two-dimensional content image region in the left eye image and right eye image of the first stereoscopic format image. Alternatively, if the currently processed image region is located in the display range of the second stereoscopic display 140, the processor 130 draws the two-dimensional content image region in the left eye image and right eye image of the second stereoscopic format image. It should be noted that the two-dimensional content image region will be drawn simultaneously in the left-eye image and the right-eye image of a certain stereoscopic format image.

If the processor 130 determines that the currently processed image region is a three-dimensional content image region, step S1046 is continued. In step S1046, the processor 130 may draw the sub-left-eye image of the 3D content image region in the left-eye image of one of the stereoscopic format images, and draw the sub-right-eye image of the 3D content image region in in the right eye image of the one of the stereoscopic format images. For example, if the currently processed image area is within the display range of the first stereoscopic display 110, the processor 130 may draw the sub-left-eye image of the 3D content image region into the left-eye image of the first stereoscopic format image, and draw the sub-right-eye image of the 3D content image region into the right-eye image of the first stereoscopic format image. Alternatively, if the currently processed image area is within the display range of the second stereoscopic display 140, the processor 130 may draw the sub-left-eye image of the 3D content image region into the left-eye image of the second stereoscopic format image, and draw the sub-right-eye image of the 3D content image region into the right-eye image of the second stereoscopic format image.

If the determination in step S1043 is yes, in step S1047, the processor 130 may divide the currently processed image region into multiple parts. When the currently processed image region is a two-dimensional content image region spanning the display splicing boundary, the processor 130 may divide the two-dimensional content image region into a first 2D part and a second 2D part. When the currently processed image region is a three-dimensional content image region that spans the display splicing boundary, the processor 130 may divide the sub-left eye image of the 3D content image region into a first left part and a second left part, and divide the sub-right eye image of the 3D content image region into a first right part and a second right part.

Next, in step S1048, the processor 130 may draw multiple parts of the image regions in the left-eye image and the right-eye image of the first stereoscopic format image and the left-eye image and the right-eye image of the second stereoscopic format image. When the currently processed image region is a two-dimensional content image region spanning the display splicing boundary, the processor 130 may draw the first 2D part in the left-eye image and the right-eye image of the first stereoscopic format image, and draw the second 2D part into the left-eye image and the right-eye image of the second stereoscopic format image.

If the currently processed image region is a 3D content image region that spans the display splicing boundary, the processor 130 may draw the first left part of the sub-left eye image of the 3D content image region in the first left eye image of the first stereoscopic format image, and draw the first right part of the sub-right eye image of the 3D content image region in the first right eye image of the first stereoscopic format image. Furthermore, the processor 130 may draw the second left part of the sub-left eye image of the three-dimensional content image region in the second left-eye image of the second stereoscopic format image, and draw the second right part of the sub-right eye image of the 3D content image region in the second right-eye image of the second stereoscopic format image.

Figure 11:
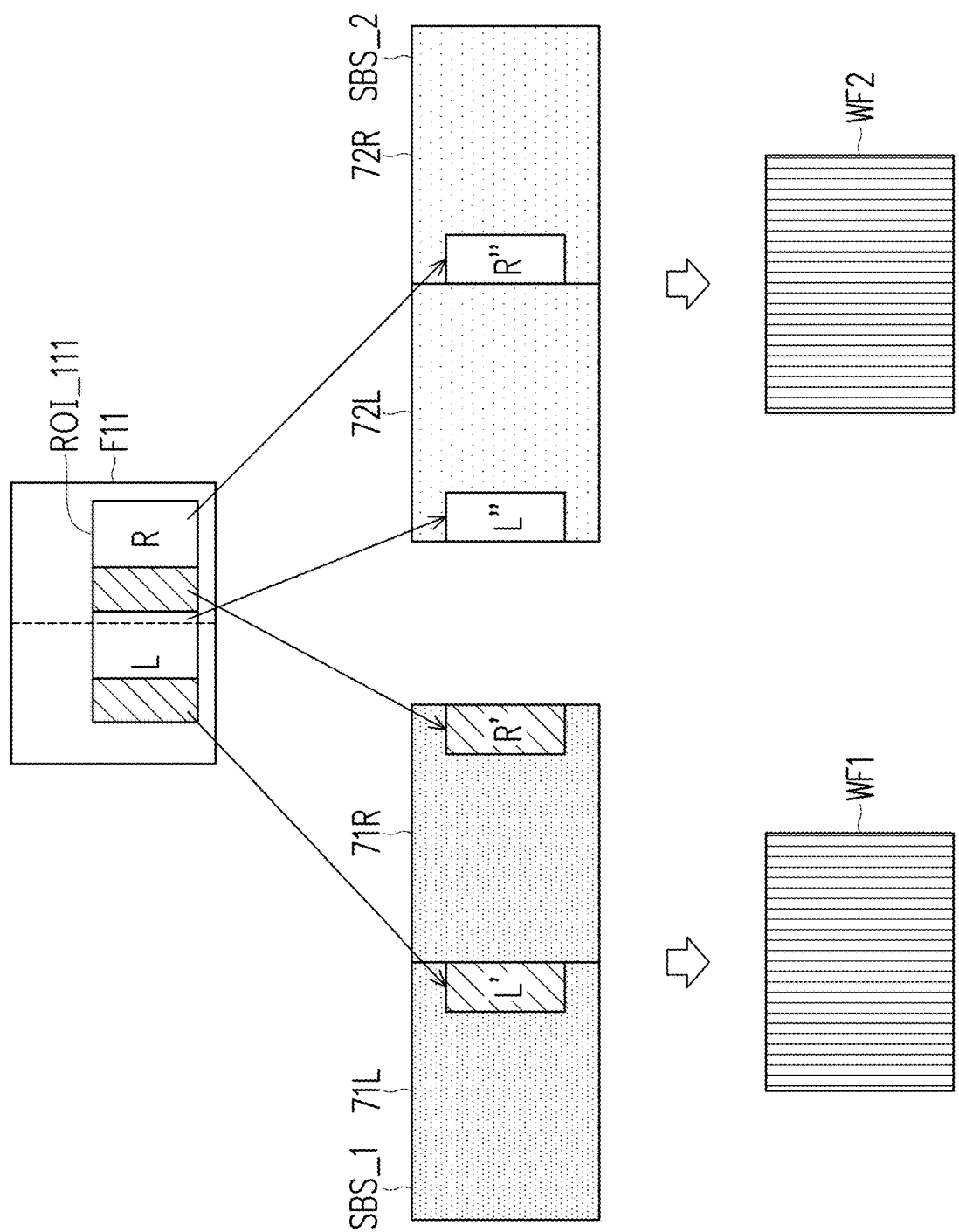
FIG. 11 is a schematic diagram of drawing a first stereoscopic format image and a second stereoscopic format image according to an embodiment of the disclosure.

For example, FIG. 11 is a schematic diagram of drawing a first stereoscopic format image and a second stereoscopic format image according to an embodiment of the disclosure. Referring to FIG. 11, in this example, the first stereoscopic display 110 and the second stereoscopic display 140 may have the same display size and resolution. The processor 130 may obtain the display frame F11 jointly displayed by the first stereoscopic display 110 and the second stereoscopic display 140. The processor 130 may identify the 3D content image region ROI_111 from the display frame F11 and determine that the 3D content image region ROI_111 cross the display splicing boundary. The 3D content image region ROI_111 includes a sub-left-eye image L and a sub-right-eye image R.

When the 3D content image region ROI_111 crosses the display splicing boundary, the processor 130 may divide the sub-left eye image L into a first left part L' and a second left part L", and divide the sub-right eye image R into a first right part R' and a second right part R".

Afterwards, the processor 130 may draw the left part of the 2D background region of the display frame F11 in the first left-eye image 71L and the first right-eye image 71R of the first stereoscopic format image SBS_1. The processor 130 may draw the right part of the two-dimensional background region of the display frame F11 in the first left eye image 72L and the first right eye image 72R of the second stereoscopic format image SBS_2.

Then, the processor 130 may draw the first left part L' of the sub-left-eye image L in the first left-eye image 71L of the first stereoscopic format image SBS_1. The processor 130 may draw the first right portion R' of the sub-right-eye image R in the first right-eye image 71R of the first stereoscopic format image SBS_1. The processor 130 may draw the second left portion L" of the sub-left-eye image L in the second left-eye image 72L of the second stereoscopic format image SBS_2. The processor 130 may draw the second right portion R" of the sub-right-eye image R in the second right-eye image 72R of the second stereoscopic format image SBS_2.

The processor 130 may perform image weaving processing on the first stereoscopic format image SBS_1 to generate the weaving frame WF1, and perform image weaving processing on the second stereoscopic format image SBS_2 to generate the weaving frame WF2. The weaving frame WF1 is displayed by the first stereoscopic display 110, and the weaving frame WF2 is displayed by the second stereoscopic display 140. Based on this, the 3D image content of the 3D content image region ROI_111 may be presented by splicing the first stereoscopic display 110 and the second stereoscopic display 140, and the user may feel the 3D visual effect brought by the 3D content image region ROI_111.

Figure 12:
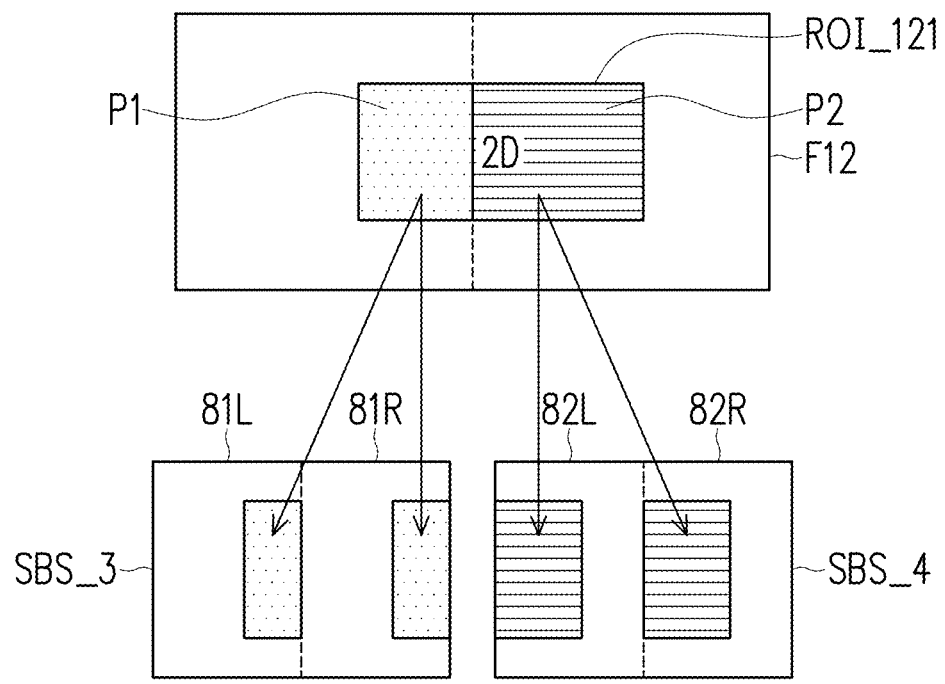
FIG. 12 is a schematic diagram of a first stereoscopic format image and a second stereoscopic format image according to an embodiment of the disclosure.

For example, FIG. 12 is a schematic diagram of a first stereoscopic format image and a second stereoscopic format image according to an embodiment of the disclosure. Referring to FIG. 12, in this example, the display size and resolution of the first stereoscopic display 110 and the second stereoscopic display 140 may be the same. The processor 130 may obtain the display frame F12 jointly displayed by the first stereoscopic display 110 and the second stereoscopic display 140. The processor 130 may identify the two-dimensional content image region ROI_121 from the display frame F12 and determine that the two-dimensional content image region ROI_121 spans the display splicing boundary.

The processor 130 may divide the two-dimensional content image region ROI_121 into a first 2D part P1 and a second 2D part P2. The processor 130 may draw the first 2D part P1 of the 2D content image region in the first right eye image 81R and the first left eye image 81L of the first stereoscopic format image SBS_3. The processor 130 may draw the second 2D part P2 of the 2D content image region in the second right eye image 82R and the second left eye image 82L of the second stereoscopic format image SBS_4.

In this example, the first right eye image 81R of the first stereoscopic format image SBS_3 may be the same as the first left eye image 81L of the first stereoscopic format image SBS_3. The second right eye image 82R of the second stereoscopic format image SBS_4 may be the same as the second left eye image 82L of the second stereoscopic format image SBS_4. The processor 130 may perform image weaving processing on the first stereoscopic format image SBS_3 to generate a weaving frame for the first stereoscopic display 110, and perform image weaving processing on the second stereoscopic format image SBS_4 to generate a weaving frame for the second stereoscopic display 140.

Returning to FIG. 10, in step S1050, the first stereoscopic display 110 operating in the stereoscopic display mode may display the first stereoscopic format image, and the second stereoscopic display 140 operating in the stereoscopic display mode may display the second stereoscopic format image. The processor 130 may perform image weaving processing on the first stereoscopic format image, and drive the first stereoscopic display 110 to display the weacing frames of the first stereoscopic format image. The processor 130 may perform image weaving processing on the second stereoscopic format image, and drive the second stereoscopic display 140 to display the weaving frames of the second stereoscopic format image.

In some embodiments, when the first stereoscopic display 110 and the second stereoscopic display 140 provide a splicing display function, the first stereoscopic display 110 and the second stereoscopic display 140 may perform synchronization according to the vertical synchronization signal (V-sync signal) provided by the GPU or Other control signals are used to synchronously display the first stereoscopic format image and the second stereoscopic format image corresponding to the same display frame.

It should be noted that in some embodiments, when the processor 130 generates the second stereoscopic format image or the image content in the first stereoscopic format image according to the image region in the display frame, the processor 130 may display Image scaling is performed on the image content of the image region in the frame.

In summary, in the embodiment of the disclosure, after acquiring the display frame, multiple image regions in the display frame may be identified. These image regions include two-dimensional content image regions and 3D content image regions. The rendering priority of each image region may be determined based on the regional characteristic of each image region. The image contents of the image regions may be drawn sequentially in the left-eye image and the right-eye image of the first stereoscopic format image. Based on this, it may ensure that the three-dimensional image content and the two-dimensional image content of the display frame may be displayed correctly, and allow users to experience a new visual experience. In addition, in embodiments of the present disclosure, multiple stereoscopic display devices may be spliced to create a wider display range. Based on this, the splicing display function of multiple stereoscopic display devices may be realized, allowing users to experience a better 3D immersion due to a larger field of view.

Although the present invention has been disclosed above through embodiments, they are not intended to limit the present invention. Anyone with ordinary knowledge in the relevant technical field may make some changes and modifications without departing from the spirit and scope of the present invention. Therefore, the protection scope of the present invention shall be determined by the appended patent application scope.

What is claimed is:

1. A stereoscopic image display method, adapted to a stereoscopic image display system comprising a first stereoscopic display, and comprises:
   obtaining a display frame;
   identifying a plurality of image regions from the display frame, wherein the image regions comprise a two-dimensional content image region and a three-dimensional content image region;
   determining a rendering priority of each of the image regions according to a regional characteristic of each of the image regions;
   sequentially drawing image content of each of the image regions into a first stereoscopic format image comprising a first left-eye image and a first right-eye image according to the rendering priority of each of the image regions; and
   displaying the first stereoscopic format image by the first stereoscopic display operating in a stereoscopic display mode,
   wherein the step of sequentially drawing the image content of each of the image regions into the first stereoscopic format image comprising the first left-eye image and the first right-eye image according to the rendering priority of each of the image regions comprises:
      obtaining a sub-left eye image and a sub-right eye image of the three-dimensional content image region;
      drawing the sub-left-eye image in the first left-eye image of the first stereoscopic format image, and drawing the sub-right-eye image in the first right eye of the first stereoscopic format image; and
      drawing the 2D content image region in the first right eye image and the first left eye image of the first stereoscopic format image.

2. The stereoscopic image display method according to claim 1, wherein the step of determining the rendering priority of each of the image regions according to the regional characteristic of each of the image regions comprises:
   determining the rendering priority of each of the image regions according to a window depth of a window corresponding to each of the image regions.

3. The stereoscopic image display method according to claim 1, wherein the step of determining the rendering priority of each of the image regions according to the regional characteristic of each of the image regions comprises:
   determining the rendering priority of each of the image regions according to a position of region boundary of each of the image regions.

4. The stereoscopic image display method according to claim 1, wherein the step of determining the rendering priority of each of the image regions according to the regional characteristic of each of the image regions comprises:
   determining the rendering priority of each of the image regions according to a region size of each of the image regions.

5. The stereoscopic image display method according to claim 1, wherein the step of identifying the image regions from the display frame comprises:
   obtaining window information for an application; and
   identifying at least one of the image regions based on the window information.

6. The stereoscopic image display method according to claim 1, wherein the step of identifying the image regions from the display frame comprises:
  recognizing a three-dimensional content block in the display frame to identify the three-dimensional content image region among the image regions.

7. The stereoscopic image display method according to claim 1, wherein the step of sequentially drawing the image content of each of the image regions into the first stereoscopic format image comprising the first left-eye image and the first right-eye image according to the rendering priority of each of the image regions further comprises:
  in response to the rendering priority of a first image region being higher than the rendering priority of a second image region, drawing the image content of the first image region first and then drawing the image content of the second image region,
  wherein the image content of the second image region partially overlaps the image content of the first image region.

8. The stereoscopic image display method according to claim 1, wherein the stereoscopic image display system further comprises a second stereoscopic display, and the step of sequentially drawing the image content of each of the image regions into the first stereoscopic format image comprising the first left-eye image and the first right-eye image according to the rendering priority of each of the image regions further comprises:
  sequentially drawing the image content of each of the image regions in the first stereoscopic format image comprising the first left-eye image and the first right-eye image and a second stereoscopic format image comprising a second left-eye image and a second right-eye image,
  wherein the method further comprises:
  displaying the second stereoscopic format image by the second stereoscopic display operating in the stereoscopic display mode.

9. The stereoscopic image display method according to claim 8, wherein the step of sequentially drawing the image content of each of the image regions in the first stereoscopic format image comprising the first left-eye image and the first right-eye image and the second stereoscopic format image comprising the second left-eye image and the second right-eye image comprises:
  dividing the sub-left eye image of the three-dimensional content image region into a first left part and a second left part and dividing the sub-right eye image of the three-dimensional content image region into a first right part and a second right part when the three-dimensional content image region crosses the display splicing boundary,
  drawing the first left part of the sub-left-eye image of the three-dimensional content image region in the first left-eye image of the first stereoscopic format image, and drawing the first right part of the sub-right eye image of the three-dimensional content image region in the first right eye image of the first stereoscopic format image; and
  drawing the second left part of the sub-left-eye image of the three-dimensional content image region in the second left-eye image of the second stereoscopic format image, and drawing the second right part of the sub-right eye image of the three-dimensional content image region in the second right eye image of the second stereoscopic format image.

10. A stereoscopic image display system, comprising:
  a first stereoscopic display; and
  at least one processor, coupled to the first stereoscopic display and configured to:
  obtain a display frame;
  identify a plurality of image regions from the display frame, wherein the image regions comprise a two-dimensional content image region and a three-dimensional content image region;
  determine a rendering priority of each of the image regions according to a regional characteristic of each of the image regions;
  sequentially draw image content of each of the image regions into a first stereoscopic format image comprising a first left-eye image and a first right-eye image according to the rendering priority of each of the image regions; and
  display the first stereoscopic format image by the first stereoscopic display operating in a stereoscopic display mode,
  wherein the processor is further configured to:
  obtain a sub-left eye image and a sub-right eye image of the three-dimensional content image region;
  draw the sub-left-eye image in the first left-eye image of the first stereoscopic format image, and draw the sub-right-eye image in the first right eye of the first stereoscopic format image;
  draw the 2D content image region in the first right eye image and the first left eye image of the first stereoscopic format image.

11. The stereoscopic image display system according to claim 10, wherein the processor is further configured to:
  determine the rendering priority of each of the image regions according to a window depth of a window corresponding to each of the image regions.

12. The stereoscopic image display system according to claim 10, wherein the processor is further configured to:
  determine the rendering priority of each of the image regions according to a position of region boundary of each of the image regions.

13. The stereoscopic image display system according to claim 10, wherein the processor is further configured to:
  determine the rendering priority of each of the image regions according to a region size of each of the image regions.

14. The stereoscopic image display system according to claim 10, wherein the processor is further configured to:
  obtain window information for an application; and
  identify at least one of the image regions based on the window information.

15. The stereoscopic image display system according to claim 10, wherein the processor is further configured to:
  recognize a three-dimensional content block in the display frame to identify the three-dimensional content image region among the image regions.

16. The stereoscopic image display system according to claim 10, wherein the processor is further configured to:
  in response to the rendering priority of a first image region being higher than the rendering priority of a second image region, draw the image content of the first image region first and then draw the image content of the second image region,
  wherein the image content of the second image region partially overlaps the image content of the first image region.

17. The stereoscopic image display system according to claim 10, further comprising a second stereoscopic display, wherein the processor is further configured to:
  sequentially draw the image content of each of the image regions in the first stereoscopic format image comprising the first left-eye image and the first right-eye image and a second stereoscopic format image comprising a second left-eye image and a second right-eye image; and
  display the second stereoscopic format image by the second stereoscopic display operating in the stereoscopic display mode.

18. The stereoscopic image display system according to claim 17, wherein the processor is further configured to:
  divide the sub-left eye image of the three-dimensional content image region into a first left part and a second left part and dividing the sub-right eye image of the three-dimensional content image region into a first right part and a second right part when the three-dimensional content image region crosses the display splicing boundary,
  draw the first left part of the sub-left-eye image of the three-dimensional content image region in the first left-eye image of the first stereoscopic format image, and draw the first right part of the sub-right eye image of the three-dimensional content image region in the first right eye image of the first stereoscopic format image; and
  draw the second left part of the sub-left-eye image of the three-dimensional content image region in the second left-eye image of the second stereoscopic format image, and draw the second right part of the sub-right eye image of the three-dimensional content image region in the second right eye image of the second stereoscopic format image.

* * * * *